United States Patent [19]
Spahr et al.

[11] 3,979,323

[45] Sept. 7, 1976

[54] METHOD OF MAKING A BITUMINOUS EMULSION

[76] Inventors: John Spahr, c/o P.O. Box 1457, Lafayette, Ind. 47902; Kenneth E. McConnaughay, deceased, late of Lafayette, Ind.; Esther L. McConnaughay, executrix, 1205 Hayes St., West Lafayette, Ind. 47906

[22] Filed: Aug. 20, 1973

[21] Appl. No.: 389,802

[52] U.S. Cl. ............................ 252/311.5; 106/277; 252/314
[51] Int. Cl.² ......................................... B01J 13/00
[58] Field of Search ................. 252/311.5; 106/277

[56] References Cited
UNITED STATES PATENTS

| | | | |
|---|---|---|---|
| 1,989,374 | 1/1935 | McConnaughay | 252/311.5 |
| 2,355,837 | 8/1944 | Wilson | 260/309.6 |
| 2,974,106 | 3/1961 | Fronmuller et al. | 252/311.5 |
| 3,097,179 | 7/1963 | Ceintrey | 252/311.5 X |

*Primary Examiner*—Richard D. Lovering
*Attorney, Agent, or Firm*—Jenkins, Hanley & Coffey

[57] ABSTRACT

A method of making a bituminous emulsion in which a fatty acid is mixed with a water solution of a base to form a water dispersion of said acid. Said dispersion is mixed with an aminoethyl substituted imidazoline to form a water soluble salt of said aminoethyl substituted imidazoline and acid. The salt is dissolved in water and then mixed in an emulsifying mill with a petroleum bitumen, said salt being added to the bitumen in an amount of from about 0.5% to about 2% based upon the weight of the bitumen.

5 Claims, No Drawings

METHOD OF MAKING A BITUMINOUS EMULSION

BACKGROUND OF THE INVENTION

For years emulsified bitumens have been mixed with aggregates to form paving compositions. These emulsions are designated primarily as medium and slow setting types and are classified as anionic, cationic, or non-anionic. They comprise normally from about 60% to about 75% of a bitumen suspended in water with the aid of emulsifying agents.

If the aggregate that is to be mixed with the emulsion contains a large amount of surface moisture, the emulsion, which normally contains about 25% to about 40% of water, is diluted to such an extent that if it may be difficult to deposit sufficient bitumen from the emulsion onto the surface of the aggregate particles, or under certain conditions, the emulsion may completely wash away.

In preparing an anionic emulsion, a chemical emulsifier is used which is normally formulated by reacting a fatty acid or a rosin acid with an alkali to produce the water soluble emulsifier. In preparing cationic emulsions, the emulsifier is prepared by reacting amines or an imidazoline with an acid such as hydrochloric acid to produce the emulsifier. Non-anionic emulsions are prepared using an emulsifier such as an organic polyglycol ether.

It is an object of this invention to prepare a bituminous emulsion which is medium setting and is not non-ionic but possesses both anionic and cationic characteristics as described by the ASTM D-244 particle charge test used to identify the ionic character of an asphaltic emulsion. It is the further object of the invention to provide such an emulsion which will have improved mixing capabilities with a wide variety of aggregates, which can be mixed with such aggregates when they are either in a wet or dry condition, and which will have improved adhesive characteristics.

SUMMARY OF THE INVENTION

In accordance with the preferred form of the invention, an organic fatty acid having an aliphatic radical containing from 10 to 19 carbon atoms is mixed with a base in the presence of water to form a water dispersion of the acid. The base is used in extremely small quantities so that the pH of the base solution is only from about 7.5 to about 9.0. After the dispersion is formed, it is mixed with an imidazoline in an amount of from about 1.5 to about 2.5 parts of the fatty acid in the dispersion with one part of imidazoline. As these two reactants are brought together with stirring, they form a soft gel. This gel is allowed to stand for from about 15 minutes to about 60 minutes while the reaction continues, after which it is stirred again until the gel dissipates into a water soluble solution and the reaction is thus complete. When the reaction is completed, a water soluble emulsifier salt is formed.

In forming a bituminous emulsion, the emulsifier is mixed with the water to be used in forming the water phase of the emulsion. This water solution containing the emulsifier is mixed, as in a colloid mill, with a petroleum bitumen alone or one which has been diluted with up to about 25% of a solvent. The water solution containing the emulsifier is mixed with the bituminous phase to provide from about .5% to about 2% of the emulsifier based upon the bitumen.

The finished emulsion can then be mixed with various types of aggregates such as gravel, limestone, natural sand, manufactured sand, slag, or combinations of aggregates containing both siliceous and carbonate particles. These aggregates may be either wet or dry. The chemical characteristics of the emulsifier are such that the emulsion, when it is mixed with wet aggregates, breaks chemically and mechanically allowing the bitumen to replace the surface moisture on the aggregate and plate out in a continuous film thereon.

DETAILED DESCRIPTION OF THE PREFERRED EMBODIMENT

The bituminous emulsion according to the instant invention can be employed with either wet or dry aggregates. In addition, it plates out on both the positive and negative plates when subjected to the ASTM D-244 particle charge test for emulsified asphalt. Thus, it has both anionic and cationic characteristics. This permits it to be used to form paving compositions with all sorts of aggregates, such as gravel, limestone, natural sand, manufactured sand, slag or combination of aggregates containing both siliceous and carbonate particles.

In forming such an emulsion, an emulsifier is first produced as represented by the following equations:

(1) RCOOH + OH → water dispersion of RCOOH (2) water dispersion of

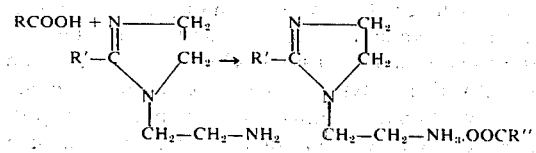

wherein R is a straight chain containing from 10 to 19 carbon atoms and may be saturated or unsaturated, and R' in the aminoethyl substituted imidazoline is an alkyl radical containing 10–19 carbon atoms. In equation (1), the base, preferably sodium hydroxide because of its low cost, is mixed with water to provide a water solution having a pH in the range of from about 7.5 to about 9.0. If this pH range is higher than about 9.0, the fatty acid will partially saponify. Conversely, if the pH range is lower than about 7.5, the fatty acid will not form a water dispersion. When sodium hydroxide is used as the base in equation (1), it is used in an amount of from about 0.5% to about 3% based upon the weight of the acid. In equation (1) it is also necessary to control the amount of water that is present. At least 9 parts of water to one part of the acid are employed since lesser amounts of water will cause a water insoluble soap to be formed.

In equation (2), the water soluble dispersion of the fatty acid is mixed with the imidazoline to produce the water soluble salt, the dispersion being added at a rate to provide from about 1.5 to about 2.5 parts of the fatty acid to one part of the imidazoline. If greater or lesser amounts of the fatty acid are employed, it will not produce an emulsifier capable of forming a stable emulsion when mixed with a bitumen. In carrying out the reaction represented in equation (2), the imidazoline and the water soluble dispersion of the fatty acid are stirred together and form a soft gel. After this gel is formed, the reactants are allowed to stand for from about 15 minutes to about 60 minutes while the reaction continues. They are then again stirred and a more rigid gel is formed, which upon continued stirring, dissipates, completing the reaction to form the finished emulsifier in the form of a solution of a water soluble salt. Each of the reactions as represented by equations (1) and (2) are carried out at room temperatures, i.e. 65° F to 80° F.

The salt can then be used as an emulsifier to produce a stable bituminous emulsion. To this end, it is dissolved in the water phase of the emulsion to be formed and mixed with a petroleum bitumen in a colloid mill. Prior to mixing the bitumen with the water phase, the bitumen may be diluted with up to 25% of a petroleum solvent selected from the class consisting of naphtha, fuel oil, gas oil, light cycle oils, and the like. The solvent gives the bitumen a viscosity such that the finished emulsion will be easily workable with the aggregate. If more than about 25% solvent is added to the bitumen, the bitumen phase of the finished emulsion will be too thin and run off of the aggregate before coating the aggregate particles.

The bitumen phase and the water phase are brought together in amounts such that the bitumen will constitute about 60% to about 75% of the weight of the finished emulsion. The emulsifier is added to the water phase in an amount such that the finished emulsion will contain from about 0.5% to about 2% of said emulsifier based upon the weight of the bitumen. If less than about 0.5% of the emulsifier is employed, an unstable emulsion will result. However, amounts above about 2% are excessive and produce no added advantage.

After the finished emulsion has been produced, it can be mixed with any type of aggregate, basic or acidic, using conventional amounts and by conventional procedures to produce a bituminous coating over said aggregate particles. As distinguished from prior coating techniques, however, the aggregate need not be dry before being mixed with the emulsion, but can be mixed therewith while the aggregate is wet.

We claim:

1. A method of making a bituminous emulsion comprising the steps of mixing a straight chain fatty acid containing from 11 to 20 carbon atoms with a water solution of a base having a pH in range of from about 7.5 to about 9.0 to produce a water dispersion of said acid, said water solution containing at least 9 parts of water to one part of said acid, mixing said dispersion with an aminoethyl substituted imidazoline to form an emulsifier, said imidazoline containing an alkyl radical containing from 10–19 carbon atoms, said dispersion being mixed with said imidazoline to provide from about 1.5 to about 2.5 parts of said fatty acid to one part imidazoline, dissolving said emulsifier in water and emulsifying it with a petroleum bitumen to form the finished emulsion, said bitumen being added in an amount to constitute from about 60% to about 75% of said emulsion and said emulsifier being added in an amount of from about 0.5% to about 2% based upon the weight of the bitumen.

2. A method of making a bituminous emulsion as set forth in claim 1 in which said bitumen is diluted with up to about 25% of a petroleum solvent.

3. A method of making a bituminous emulsion as set forth in claim 2 in which said solvent is selected from the class consisting of naphtha, fuel oil, gas oil, and light cycle oils.

4. A method of making a bituminous emulsion as set forth in claim 1 in which said step of mixing said dispersion with said imidazoline comprises stirring them together to form a gel, letting said gel stand for from about 15 to 60 minutes, and then restirring said gel to dissipate said gel into a solution.

5. A method of making a bituminous emulsion comprising the steps of mixing a straight chain fatty acid containing from 11 to 20 carbon atoms with a water solution of a base having a pH in the range of from about 7.5 to about 9.0 to form a water dispersion of said acid containing at least 9 parts of water and one part of said acid, mixing said dispersion with an aminoethyl substituted imidazoline containing an alkyl radical containing from 10–19 carbon atoms at a rate to provide from about 1.5 to about 2.5 parts of said fatty acid to one part of said imidazoline to form a water soluble emulsifier salt of said acid and imidazoline, and emulsifying a water solution of said emulsifier with a petroleum bitumen.

* * * * *

UNITED STATES PATENT OFFICE
CERTIFICATE OF CORRECTION

Patent No. 3,979,323        Dated September 7, 1976

Inventor(s) John Spahr and Kenneth E. McConnaughay

It is certified that error appears in the above-identified patent and that said Letters Patent are hereby corrected as shown below:

Column 2, in the equation appearing in lines 31-37, that portion of the equation reading " OOCR" " should read -- OOCR --.

Signed and Sealed this

Eleventh Day of January 1977

[SEAL]

Attest:

RUTH C. MASON  
Attesting Officer

C. MARSHALL DANN  
Commissioner of Patents and Trademarks